US011313715B1

(12) United States Patent
Weinberger

(10) Patent No.: US 11,313,715 B1
(45) Date of Patent: Apr. 26, 2022

(54) WEIGHING APPARATUS FOR A LIFTING DEVICE

(71) Applicant: SHKILA MANUFACTURERS LTD, Caesarea Industrial Park (IL)

(72) Inventor: Daniel Menachem Weinberger, Kibbutz Mishmarot (IL)

(73) Assignee: SHKILA MANUFACTURERS LTD, Caesarea Industrial (IL)

( * ) Notice: Subject to any disclaimer, the term of this patent is extended or adjusted under 35 U.S.C. 154(b) by 0 days.

(21) Appl. No.: 17/340,306

(22) Filed: Jun. 7, 2021

(51) Int. Cl.
*G01G 19/08* (2006.01)
*G01G 19/12* (2006.01)

(52) U.S. Cl.
CPC ............ *G01G 19/083* (2013.01); *G01G 19/12* (2013.01)

(58) Field of Classification Search
CPC .............................. G01G 19/083; G01G 19/12
See application file for complete search history.

(56) References Cited

U.S. PATENT DOCUMENTS

| | | | | |
|---|---|---|---|---|
| 4,899,840 A | * | 2/1990 | Boubille | ............ G01G 19/083 177/139 |
| 5,986,560 A | * | 11/1999 | Rayburn | ............ G01G 19/083 177/136 |
| 6,600,111 B2 | | 7/2003 | Simons | |
| 8,957,329 B2 | | 2/2015 | Simons | |
| 10,107,673 B2 | | 10/2018 | Liang et al. | |
| 2003/0234122 A1 | | 12/2003 | Kroll et al. | |
| 2007/0041820 A1 | | 2/2007 | Simons | |
| 2016/0069733 A1 | * | 3/2016 | Warzecha | ............ G01G 19/06 177/136 |
| 2017/0261364 A1 | * | 9/2017 | Liang | .................. G01G 3/1402 |
| 2020/0141790 A1 | * | 5/2020 | Van Den Berg | ..... G01G 19/083 |
| 2020/0264034 A1 | * | 8/2020 | Lyda | ...................... G01G 23/36 |

FOREIGN PATENT DOCUMENTS

KR          20160085157 A          7/2016

* cited by examiner

*Primary Examiner* — Randy W Gibson
(74) *Attorney, Agent, or Firm* — Dorsey & Whitney LLP

(57) ABSTRACT

Weighing apparatus, for use with a lifting device, is provided including a weighing unit and a cover shaped and sized to at least partially surround a tine of the lifting device. The weighing unit weighs a load that is lifted by the lifting device and is coupled to a lateral side of the cover such that the weighing unit is placed alongside the cover. The weighing unit includes one or more load cells, and an upper surface configured to contact the load lifted by the lifting device. A height of the weighing apparatus varies between the cover and the weighing unit such that a height of the weighing unit is greater than a height of the cover, thereby forming a gap between the load and the cover when a load is lifted by the lifting device. Other applications are also described.

25 Claims, 8 Drawing Sheets

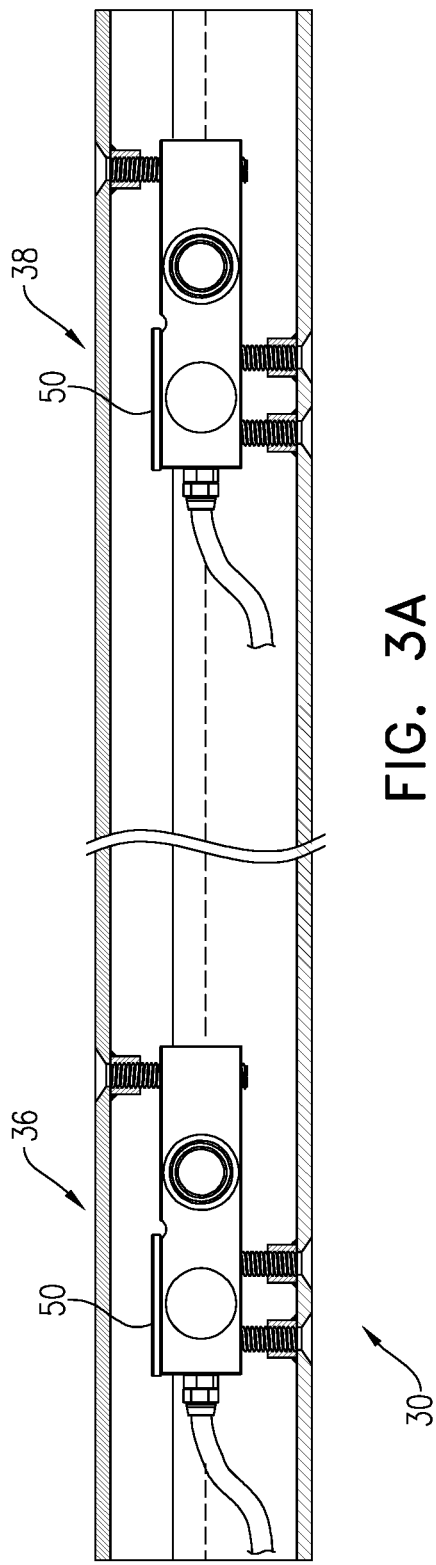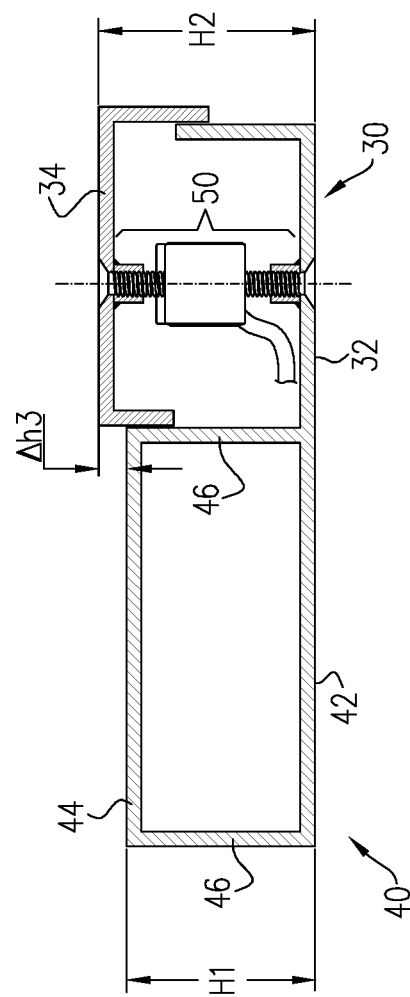

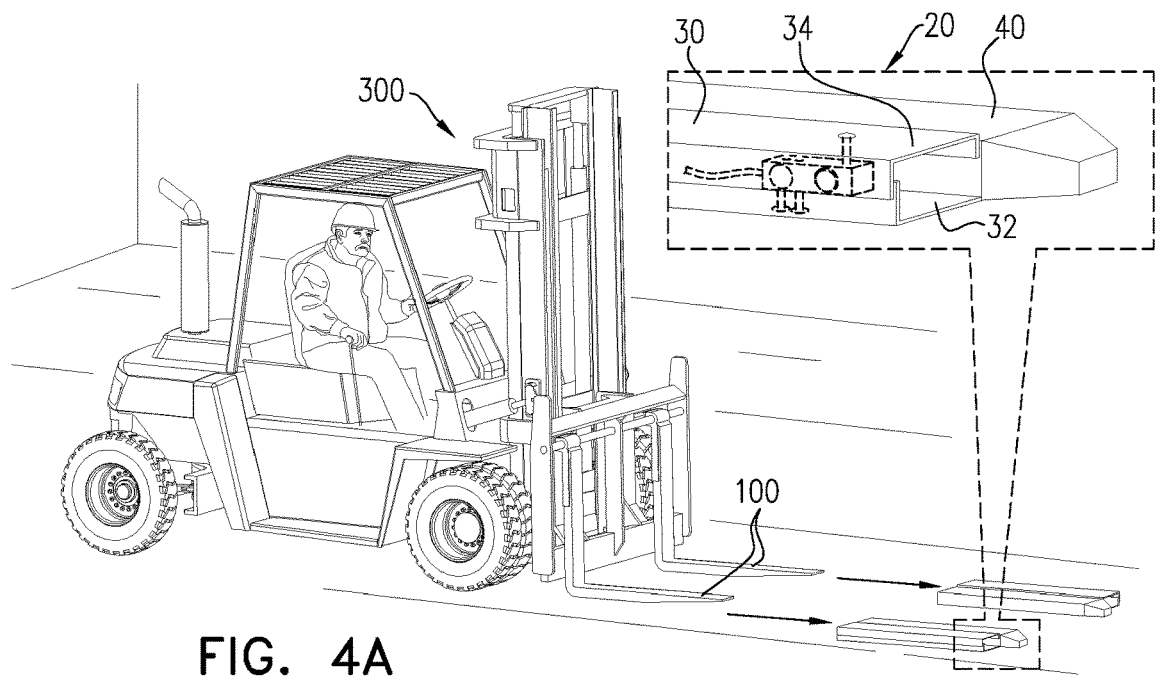
FIG. 4A
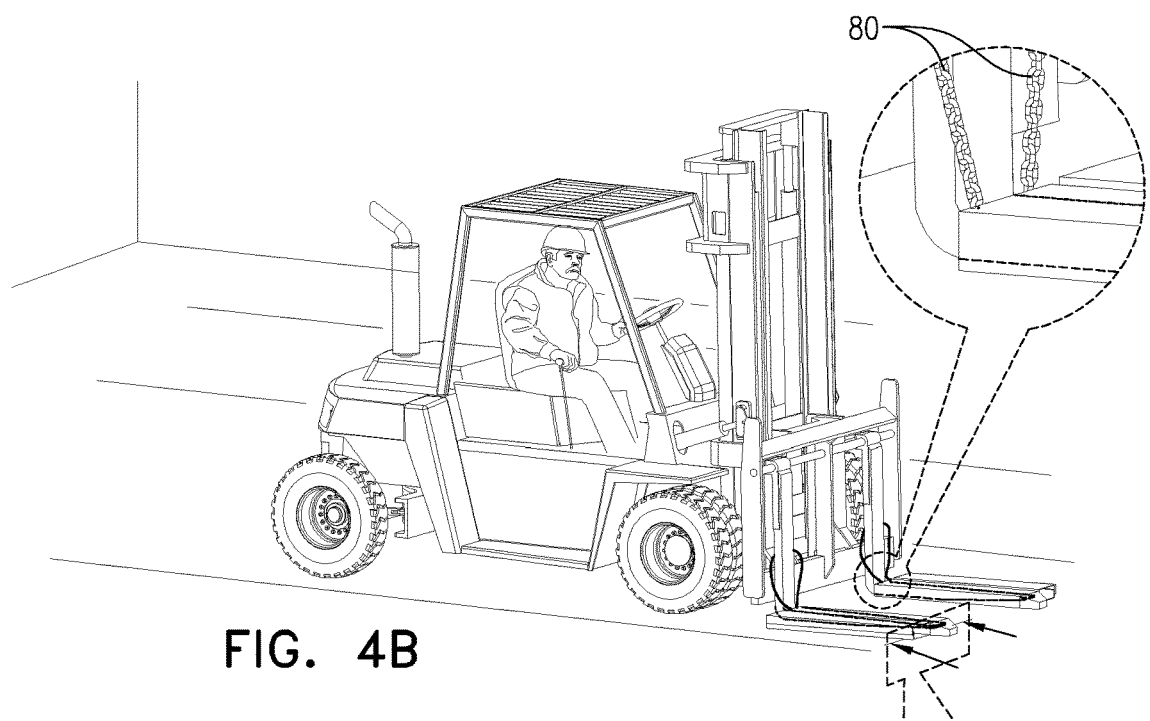
FIG. 4B
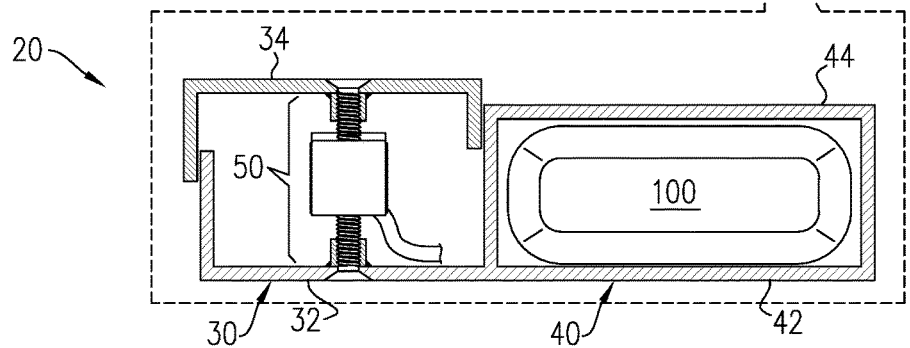

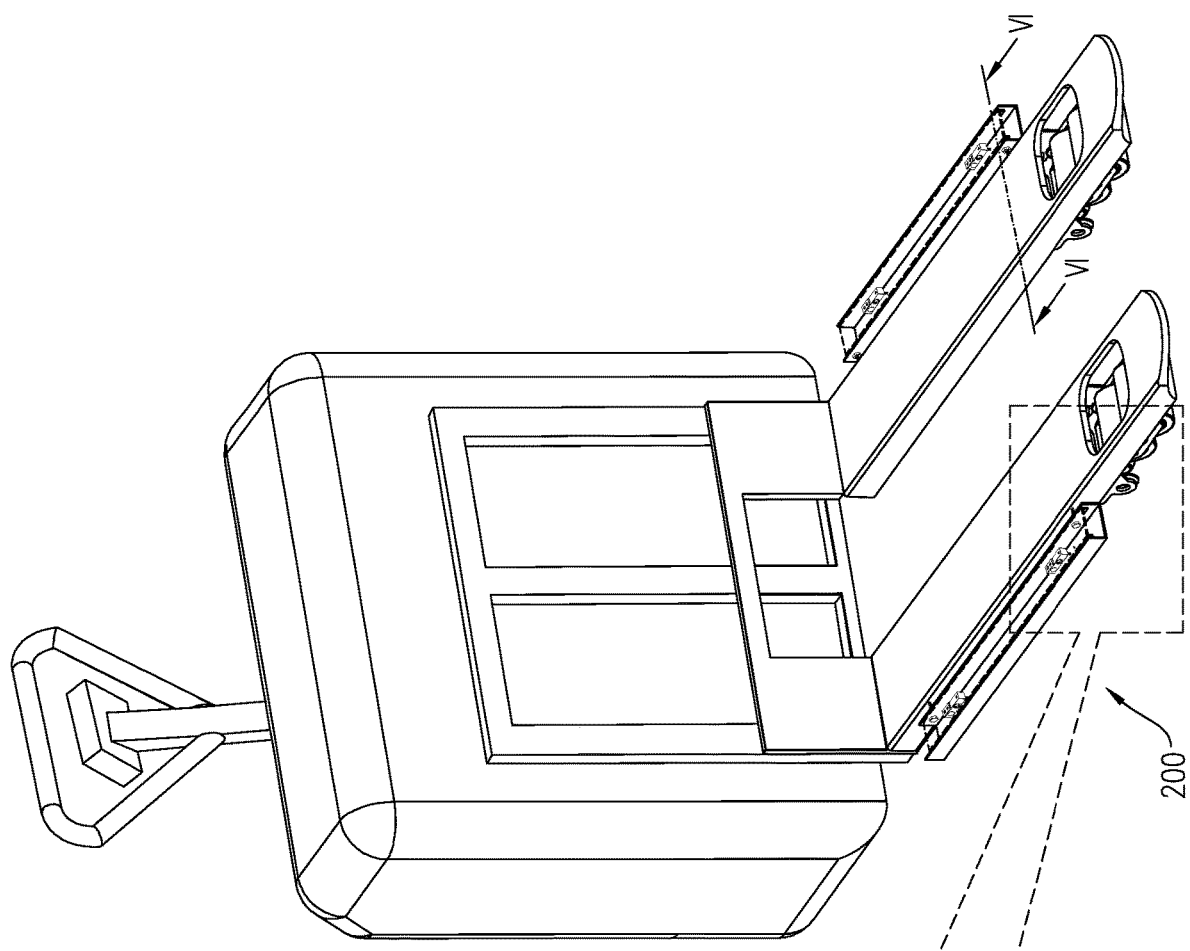
FIG. 5A
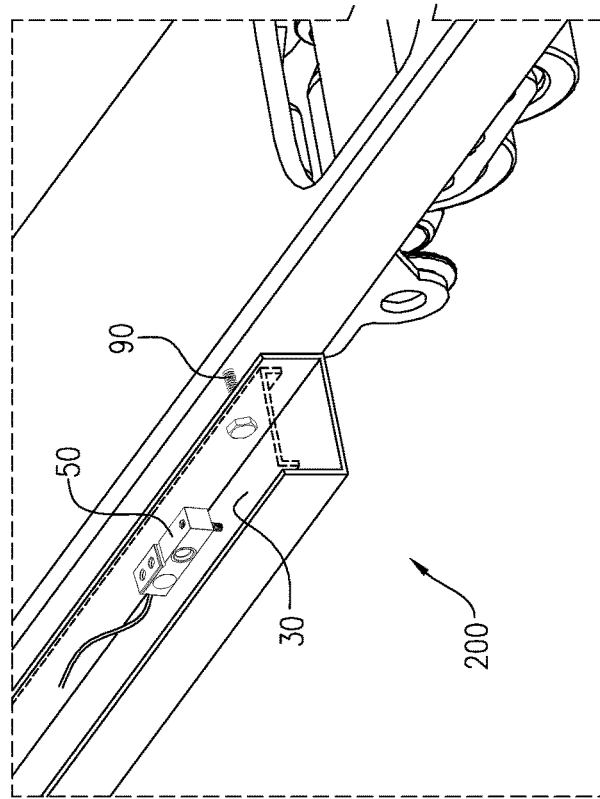

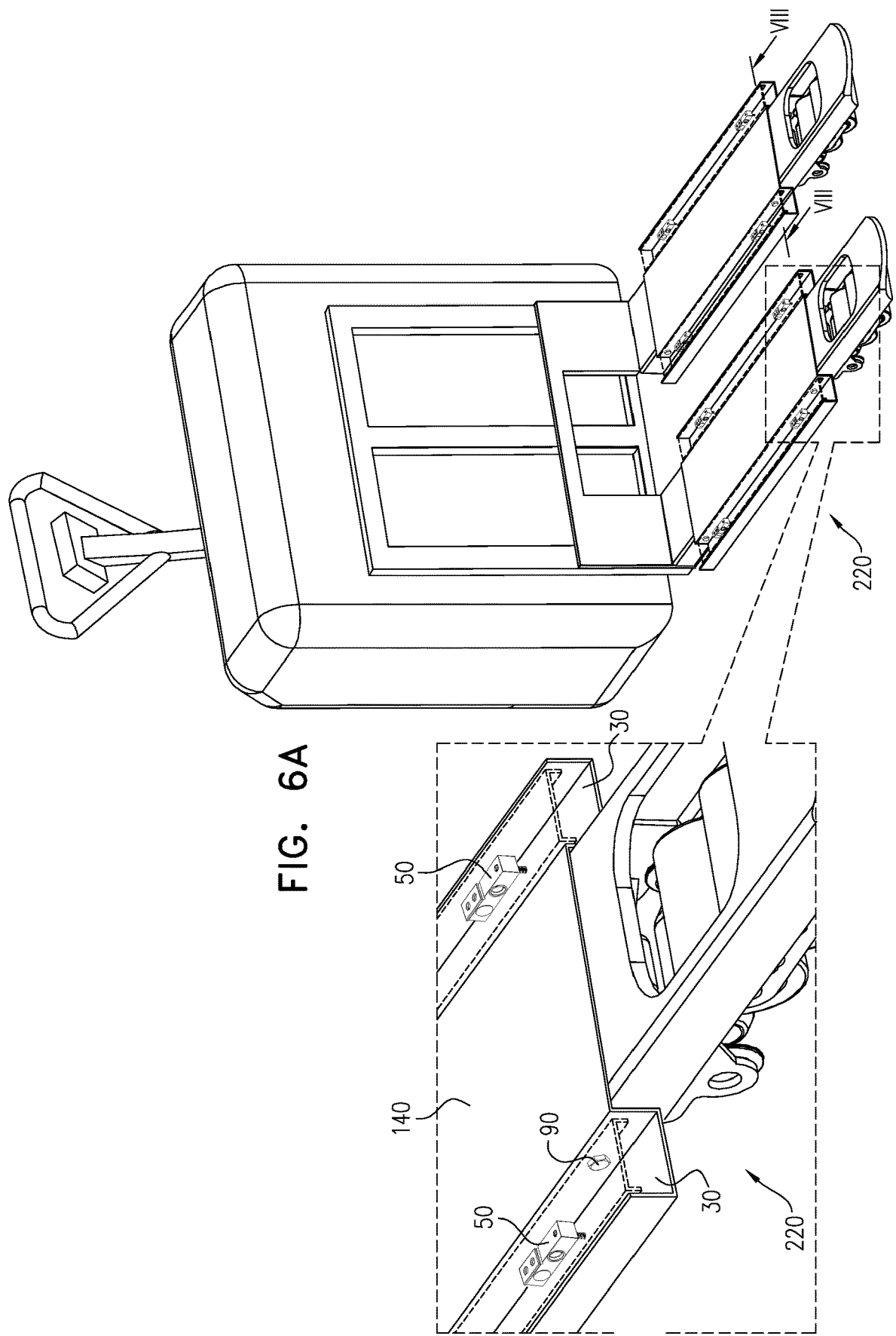

WEIGHING APPARATUS FOR A LIFTING DEVICE

FIELD OF EMBODIMENTS OF THE INVENTION

Some applications of the present invention generally relate to weighing scales. More specifically, some applications of the present invention relate to weighing scale apparatus and methods for use with lifting vehicles such as forklifts.

BACKGROUND

A forklift is a powered industrial vehicle used to lift and move heavy loads over short distances. Typically, forklifts have two side-by-side "forks", also known as blades or tines, which are typically side-by-side horizontally extending metal members which perform the lifting action. Forklifts are typically an integral part of the operation of factories, warehouses and distribution centers.

It is often desirable to weigh a load lifted by the forklift (or any other type of lifting device). For example, some forklifts may be limited to loads at a specific maximum weight. A load that exceeds such a maximum weight may compromise stability and impair operation of the forklift. It is therefore, for the above reason, and others, desirable to determine the weight of a load lifted by the forklift.

SUMMARY

In accordance with some applications of the present invention, weighing apparatus is provided for use with a lifting device, such as a forklift, for weighing loads lifted by the forklift while they are being lifted. The weighing apparatus is typically removably attachable to tines of the forklift such it easily integrates with various types of forklifts without requiring modifications to the forklifts.

For some applications, the weighing apparatus comprises a cover, such as a sleeve or a sheath, which is shaped and sized to, at least partially, surround a tine of the forklift. For example, the tine slides into the cover such that the tine is fully placed within the cover. The weighing apparatus additionally comprises a weighing unit configured to weigh a load that is being lifted by the forklift. The weighing unit is typically coupled to a lateral side of the cover such that the weighing unit is placed alongside the cover. The weighing unit typically has a lower surface, an upper surface, which contacts the load lifted by the forklift, and one or more load cells disposed between the lower surface and the upper surface. A height of the weighing apparatus varies between the cover and the weighing unit such that a height of the weighing unit is greater than a height of the cover. When a load is lifted by the forklift, a gap forms between the upper surface of the cover and the load, such that the load is supported by the weighing unit, and not by the tine of the forklift which is fitted into the cover. Typically, by providing the weighing unit alongside the cover such that weighing of the load is done by the weighing unit, height of the weighing apparatus is reduced, relative to if, for example, the weighing unit were to be configured to be placed above the tine of the forklift. For example, a height of the upper surface of the weighing unit above the tine may be 0.1-5 cm, thereby reducing the total height added to the tine by the weighing apparatus, relative to if, for example, the weighing unit were to be configured to be placed above the tine of the forklift. This is particularly advantageous when using lifting devices such as forklifts that have limited vertical space.

There is therefore provided in accordance with some applications of the present invention, a weighing apparatus for use with a lifting device that includes a tine, the weighing apparatus including:

a cover shaped and sized to at least partially surround the tine of the lifting device;

a weighing unit configured to weigh a load that is lifted by the lifting device, the weighing unit coupled to a lateral side of the cover such that the weighing unit is placed alongside the cover, and including:
  (i) one or more load cells; and
  (ii) an upper surface disposed above the one or more load cells and configured to contact the load lifted by the lifting device; and a height of the weighing apparatus varies between the cover and the weighing unit such that a height of the weighing unit is greater than a height of the cover, thereby forming a gap between the load and the cover when a load is lifted by the lifting device.

For some applications, the cover includes a sleeve shaped and sized to at least partially surround the tine.

For some applications, the cover includes a sleeve shaped and sized to receive the tine of the lifting device to fully surround at least a portion of the tine.

For some applications, the cover is configured to partially surround the tine of the lifting device such that an upper portion of the tine is covered by the cover, and a lower portion of the tine is not covered by the cover.

For some applications, the lower portion of the tine includes one or more wheels, and the cover allows operation of the one or more wheels.

For some applications, the cover is removably couplable to the tine of the lifting device.

For some applications, the apparatus further includes a securing element configured to removably secure the apparatus to the lifting device.

For some applications, a height of the upper surface of the weighing unit above the tine is 0.1-5 cm.

For some applications, a height difference between the cover and the weighing unit is 0.1-5 cm.

For some applications, a height difference between the cover and the weighing unit is 0.5-1 cm.

For some applications, a height difference between the cover and the weighing unit is 0.5-2 cm.

For some applications, a height difference between the cover and the weighing unit is a minimum of 0.1 cm.

For some applications, a height difference between the cover and the weighing unit is a maximum of 5 cm.

For some applications, a width that the apparatus adds to the tine is less than 8 cm.

For some applications, the cover does not include load cells.

For some applications, the tine of the lifting device does not include load cells.

For some applications, the one or more load cells include 1-6 load cells.

For some applications, the upper surface of the weighing unit is disposed above the one or more load cells such that the one or more load cells contact the upper surface.

For some applications, the weighing unit further includes a lower surface, and the one or more load cells are disposed between the lower surface and the upper surface of the weighing unit.

For some applications, the one or more load cells are disposed between the lower surface and the upper surface such as to contact the lower and upper surfaces of the weighing unit.

For some applications, the weighing unit has a proximal portion and a distal portion and the apparatus includes at least first, and second load cells disposed at the proximal and distal portions, respectively.

For some applications, the lifting device includes a forklift, and the weighing apparatus is configured for use with the forklift.

There is further provided in accordance with some applications of the present invention, a method of weighing a load lifted by a lifting device that includes a tine, the method including:

at least partially surrounding the tine of the lifting device with a cover, the cover being coupled to a weighing unit alongside a lateral side of the cover, the weighing unit including one or more load cells;

lifting the load by the lifting device such that (i) the load contacts the weighing unit, and (ii) a gap forms between the cover and the load; and weighing the load using the load cells in the weighing unit.

For some applications, at least partially surrounding the tine of the lifting device with the cover includes at least partially surround the tine with a sleeve.

For some applications, at least partially surrounding the tine of the lifting device with the cover includes fully surrounding the tine with a sleeve.

For some applications, at least partially surrounding the tine of the lifting device with the cover includes partially surrounding the tine of the lifting device such that an upper portion of the tine is covered by the cover, and a lower portion of the tine is not covered by the cover.

For some applications, the lower portion of the tine has one or more wheels, and at least partially surrounding the tine of the lifting device with the cover includes surrounding the tine with the cover such that the one or more wheels are allowed to operate.

For some applications, the method further includes removably securing the cover to the lifting device using a securing element.

There is yet further provided in accordance with some applications of the present invention, a weighing apparatus for use with a lifting device that includes a tine, the weighing apparatus including:

a weighing unit configured to weigh a load that is lifted by the lifting device, the weighing unit including:
(i) one or more load cells; and
(ii) an upper surface disposed above the one or more load cells and configured to contact the load lifted by the lifting device; and a coupling element configured to couple the weighing unit to a lateral side of the tine of the lifting device such that: (a) the weighing unit is placed alongside the tine, and (b) a height of the upper surface of weighing unit is greater than a height of an upper surface of the tine, thereby forming a gap between the load and the tine when a load is lifted by the lifting device.

For some applications, the coupling element includes a mechanical coupling element.

For some applications, the coupling element includes a magnetic coupling element.

For some applications, the coupling element includes a cover shaped and sized to at least partially surround a tine of the lifting device.

For some applications, the lifting device includes a forklift, and the weighing apparatus is configured for use with the forklift.

For some applications, the lifting device includes a pallet truck, and the weighing apparatus is configured for use with the pallet truck.

For some applications, wherein the coupling element is configured to couple the weighing unit to the lateral side of the tine of the lifting device such that, a height of the upper surface of the weighing unit above the upper surface of the tine is 0.1-5 cm.

For some applications, the tine of the lifting device does not include load cells.

For some applications, the one or more load cells include 1-6 load cells.

For some applications, the upper surface of the weighing unit is disposed above the one or more load cells such that the one or more load cells contact the upper surface.

For some applications, the weighing unit further includes a lower surface, and the one or more load cells are disposed between the lower surface and the upper surface of the weighing unit.

For some applications, the one or more load cells are disposed between the lower surface and the upper surface such as to contact the lower and upper surfaces of the weighing unit.

There is still further provided in accordance with some applications of the present invention, a weighing apparatus for use with a forklift that includes a tine, the weighing apparatus including:

a cover shaped and sized to at least partially surround the tine of the forklift;

a weighing unit configured to weigh a load that is lifted by the forklift, the weighing unit coupled to a lateral side of the cover such that the weighing unit is placed alongside the cover, and including:
(i) one or more load cells; and
(ii) an upper surface disposed above the one or more load cells and configured to contact the load lifted by the forklift; and a height of the weighing apparatus varies between the cover and the weighing unit such that a height of the weighing unit is greater than a height of the cover, thereby forming a gap between the load and the cover when a load is lifted by the forklift.

For some applications, the cover includes a sleeve shaped and sized to at least partially surround the tine.

For some applications, the cover includes a sleeve shaped and sized to receive the tine of the forklift to fully surround at least a portion of the tine.

For some applications, the cover is configured to partially surround the tine of the forklift such that an upper portion of the tine is covered by the cover, and a lower portion of the tine is not covered by the cover.

For some applications, the lower portion of the tine includes one or more wheels, and the cover allows operation of the one or more wheels.

For some applications, a height of the upper surface of the weighing unit above the tine is 0.1-5 cm.

For some applications, a height difference between the cover and the weighing unit is 0.1-5 cm.

For some applications, a height difference between the cover and the weighing unit is a minimum of 0.1 cm.

For some applications, a height difference between the cover and the weighing unit is a maximum of 5 cm.

For some applications, a width that the apparatus adds to the tine is less than 8 cm.

For some applications, the cover does not include load cells.

For some applications, the tine of the forklift does not include load cells.

For some applications, the one or more load cells include 1-6 load cells.

For some applications, the upper surface of the weighing unit is disposed above the one or more load cells such that the one or more load cells contact the upper surface.

For some applications, the weighing unit further includes a lower surface, and the one or more load cells are disposed between the lower surface and the upper surface of the weighing unit.

For some applications, the one or more load cells are disposed between the lower surface and the upper surface such as to contact the lower and upper surfaces of the weighing unit.

For some applications, the weighing unit has a proximal portion and a distal portion and the apparatus includes at least first, and second load cells disposed at the proximal and distal portions, respectively.

For some applications, the cover is removably couplable to the tine of the forklift.

For some applications, the apparatus further includes a securing element configured to removably secure the apparatus to the forklift.

There is yet further provided in accordance with some applications of the present invention, a method of weighing a load lifted by a forklift that includes a tine, the method including:

at least partially surrounding the tine of the forklift with a cover, the cover being coupled to a weighing unit alongside a lateral side of the cover, the weighing unit including one or more load cells;

lifting the load by the forklift such that (i) the load contacts the weighing unit, and (ii) a gap forms between the cover and the load; and weighing the load using the load cells in the weighing unit.

For some applications, at least partially surrounding the tine of the forklift with the cover includes at least partially surround the tine with a sleeve.

For some applications, at least partially surrounding the tine of the forklift with the cover includes fully surrounding the tine with a sleeve.

For some applications, at least partially surrounding the tine of the forklift with the cover includes partially surrounding the tine of the forklift such that an upper portion of the tine is covered by the cover, and a lower portion of the tine is not covered by the cover.

For some applications, the lower portion of the tine has one or more wheels, and at least partially surrounding the tine of the forklift with the cover includes surrounding the tine with the cover such that the one or more wheels are allowed to operate.

For some applications, the method further includes removably securing the cover to the forklift using a securing element.

The present invention will be more fully understood from the following detailed description of embodiments thereof, taken together with the drawings, in which:

BRIEF DESCRIPTION OF THE DRAWINGS

FIG. 3A is a schematic illustration of a cross section of a weighing unit of the weighing apparatus for use with a lifting device, such as a forklift, in accordance with some applications of the present invention;

FIG. 3B is a schematic illustration of a cross section of the weighing apparatus for use with a lifting device, such as a forklift, in accordance with some applications of the present invention;

FIGS. 4A, 4B, 4C and 4D are schematic illustrations of weighing apparatus for use with a lifting device, such as a forklift, being used with the forklift, in accordance with some applications of the present invention;

FIG. 5A is a schematic illustration of a weighing apparatus for use with a lifting device, in accordance with another application of the present invention;

FIG. 6A is a schematic illustration of a weighing apparatus for use with a lifting device, such as a pallet truck, in accordance with another application of the present invention.

DETAILED DESCRIPTION OF EMBODIMENTS

Figure 1:
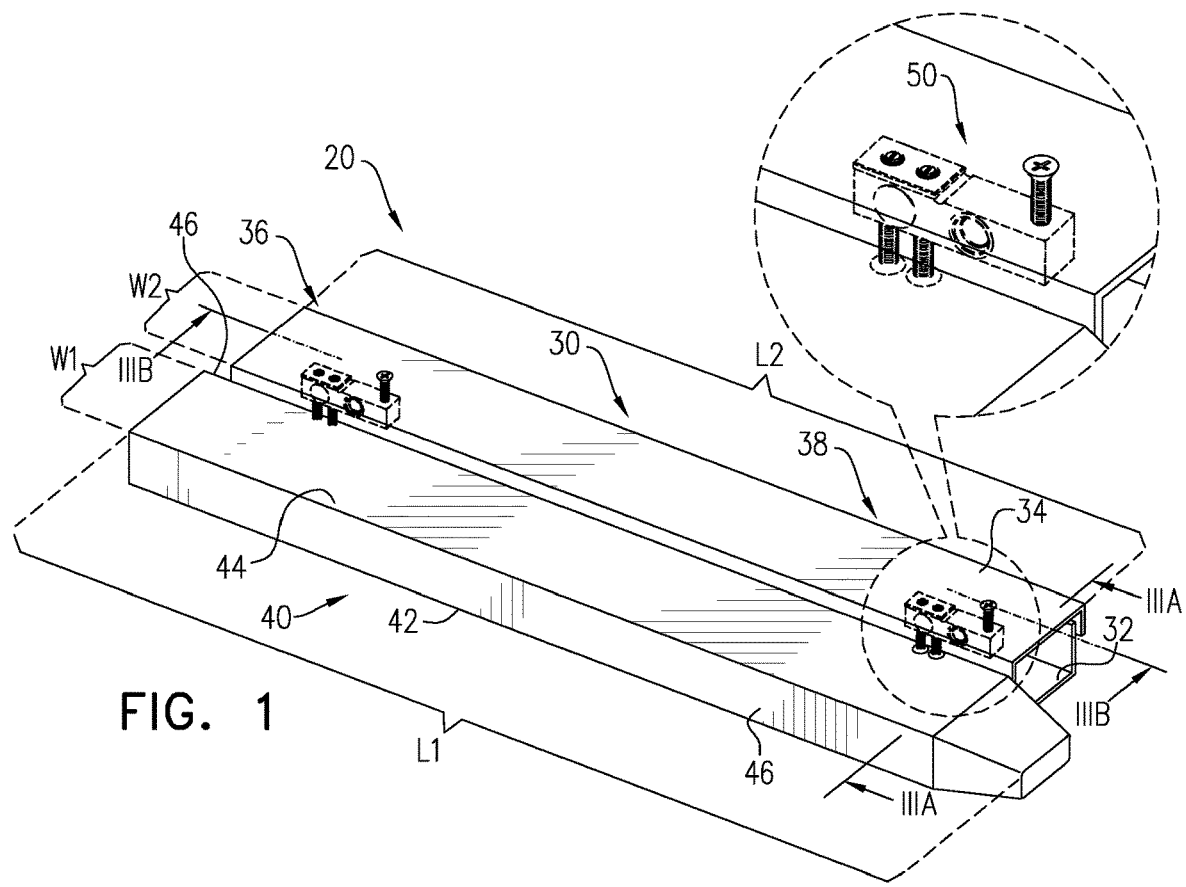
FIG. 1 and FIG. 2 are schematic illustrations of weighing apparatus for use with a lifting device, such as a forklift, in accordance with some applications of the present invention.
Figure 2:
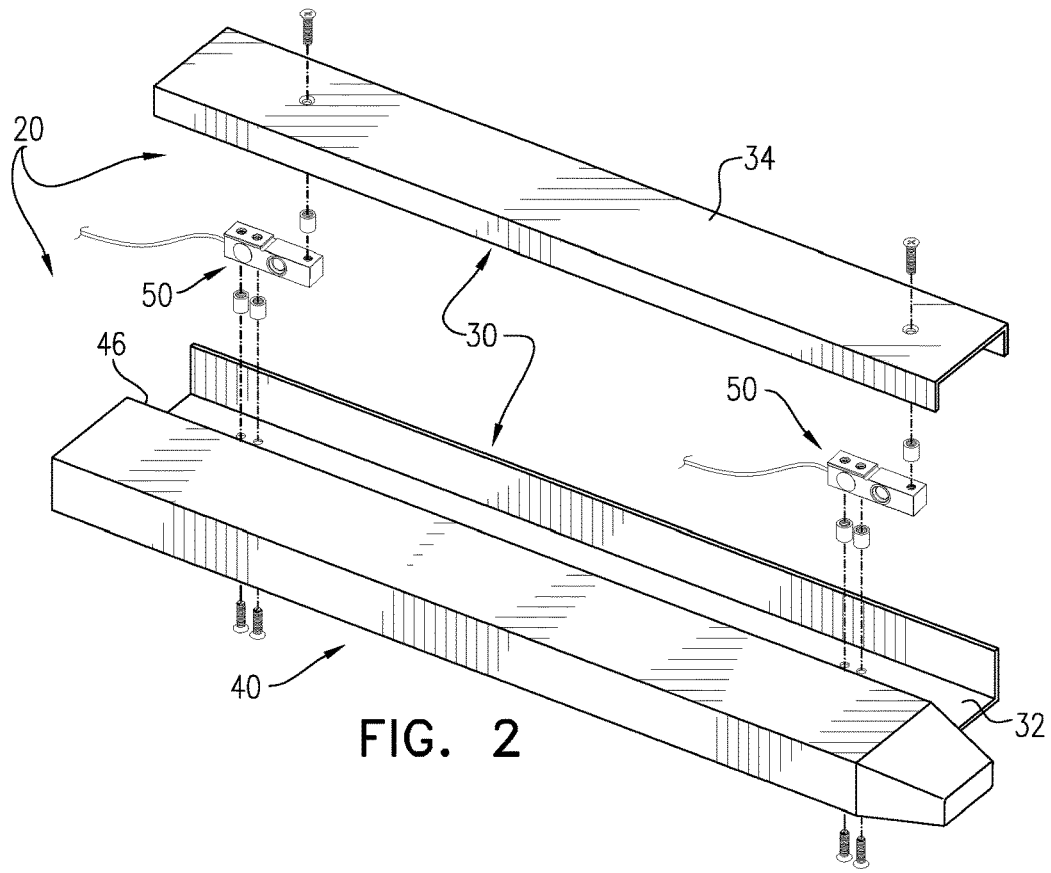

Reference is made to FIG. 1 and FIG. 2, which are schematic illustrations of weighing apparatus 20 for use with a lifting device, e.g., a lifting vehicle such as a forklift, in accordance with some applications of the present invention. Weighing apparatus 20 is configured for weighing loads lifted by the forklift during operation of the forklift. Conveniently, by facilitating weighing loads while they are being lifted by the forklift, use of weighing apparatus 20 typically obviates the need to weigh the load on a separate floor scale.

Weighing apparatus 20 is shaped and sized to couple to the forklift when it is desirable to weigh loads that are being lifted and transported by the forklift, and to be removed from the forklift once the load has been weighed. Weighing apparatus 20 is typically configured for easy attachment to, and subsequent removal from, various types of forklifts, without the need to adapt the forklift to weighing apparatus 20.

As shown, weighing apparatus 20 typically comprises a cover 40 and a weighing unit 30. Cover 40 and a weighing unit 30 are attached to form a single unit of weighing apparatus 20.

Cover 40 is typically shaped and sized to, at least partially, surround a load-lifting platform of a lifting device, such as a forklift. For example, when weighing apparatus 20 is used with a forklift, cover 40 is shaped and sized to surround a tine of the forklift at least partially. For some applications, cover 40 comprises a sleeve or a sheath shaped and sized to receive the tine of the forklift such that the tine is inserted into the sleeve or sheath. Cover 40 is removably attachable to the tine, such that it is placed on the tine and subsequently removed from the tine as desirable. For some applications, cover 40 is placed on/removed from the tine by sliding on/off the tine. Additionally, or alternatively, the apparatus includes a securing element 80 configured to secure cover 40 to the tine to avoid inadvertent sliding of cover 40 off the tine (an example of securing element 80 being shown in FIG. 4B). As shown, in FIG. 1, cover 40 has lower surface 42, upper surface 44 and lateral sides 46. Typically, cover 40 has a length L1 of 10-250 cm, and a width W1 of 5-30 cm, e.g., 10-20 cm.

Weighing apparatus 20 additionally comprises weighing unit 30, which is coupled to one of lateral sides 46 of cover 40, such that weighing unit 30 is placed alongside cover 40, as shown, in FIGS. 1-2. It is noted that for some applications, weighing apparatus 20 comprises an additional weighing unit 30, coupled to second lateral side 46 of cover 40. For such applications, weighing of a load may be done by either one or both of weighing units 30.

Weighing unit 30 functions as a weighing scale configured to weigh the load that is lifted by the forklift. For some applications, weighing unit 30 has a lower surface 32, an upper surface 34, and one or more load cells 50 disposed between lower surface 32 and upper surface 34. Typically, one or more load cells 50 are disposed between lower surface 32 and upper surface 34 such as to contact lower and/or upper surfaces 32 and 34 of weighing unit 30.

Load cells 50 are configured to sense the load lifted by the forklift and generate a signal in response thereto to indicate the weight of the load. Load cells 50 may be any type of load cell, e.g., hydraulic, pneumatic, or any type of strain gauge. When a load is lifted by the forklift, the load contacts upper surface 34 of weighing unit 30, such that pressure of the load is applied to, and sensed by, load cells 50. For some applications, load cells 50 are distributed along a length L2 of weighing unit 30 to facilitate accurate weighing of the load placed across the tine. For example, as shown in FIGS. 1-2, weighing unit 30 comprises at least two load cells 50, with one load cell disposed within a proximal portion 36 of weighing unit 30 and one load cell disposed within a distal portion 38 of weighing unit 30. For some applications, utilizing load cells that are disposed at respective locations along the weighing unit (or, optionally, along a substantial portion of the length of the weighing unit), facilitates calculating the location of the center of mass of a load that is placed upon the weighing unit (with such calculations typically being performed by a computer processor 242 described hereinbelow).

Typically, length L2 of weighing unit 30 is 3-250 cm and a width W2 of weighing unit 30 is 0.5-8 cm, e.g., 2-7 cm.

Reference is now made to FIG. 3A, which is a schematic illustration of a cross section along the length of weighing unit 30, in accordance with some applications of the present invention. (The direction of the cross section that is shown in FIG. 3A is indicated in FIG. 1.) As shown, for some applications, weighing unit 30 comprises first and second load cells 50 disposed at proximal portion 36 and distal portion 38 of the weighing unit. In it noted that that in the context of the present application, in the specification and the claims, the proximal portion of the weighing unit refers to the portion closer to a base of the tine when weighing apparatus 20 is placed on the tine (the base of the tine being the coupling location of the tine to the forklift vehicle), and the distal portion refers to farther from that base. FIG. 3A additionally shows load cells 50 being disposed between, and in contact with, lower and upper surfaces 32 and 34 of weighing unit 30.

It is noted that FIGS. 1-3A show weighing apparatus 20 as having two load cells 50 by way of illustration and not limitation. Weighing apparatus 20 may comprise any number of load cells 50 disposed at any location in weighing unit 30. For example, weighing unit 30 comprises 1-6 load cells. It is further noted, that in accordance with some applications of the present invention, cover 40 does not comprise any load cells and does not have any other form of a weighing scale or weight measurement capabilities. For some applications, weighing apparatus 20 is configured for use with forklifts that do not comprise any load cells or any other form of weight measurement capabilities.

Reference is now made to FIG. 3B, which is a schematic illustration of a cross section of weighing apparatus 20, in accordance with some applications if the present invention. (The direction of the cross section that is shown in FIG. 3B is indicated in FIG. 1.) As shown, weighing apparatus 20 defines weighing unit 30 (comprising load cells 50) coupled to lateral side 46 of cover 40, such that weighing unit 30 is placed alongside cover 40. Additionally, the height of weighing apparatus 20 varies between cover 40 and weighing unit 30 such that height H2 of weighing unit 30 is greater than height H1 of cover 40. Height H1 of cover 40 of weighing apparatus 20 is defined by lower surface 42 and by upper surface 44 of cover 40. Height H2 of weighing unit 30 of weighing apparatus 20 is defined by lower surface 32 and by upper surface 34 of weighing unit 30. As shown, upper surface 34 of weighing unit 30 is stepped with respect to upper surface 44 of cover 40, and both upper surfaces 34 and 44 are generally parallel to lower surfaces 32 and 42 (lower surfaces 32 and 42 being on the same plane). The step between upper surface 44 and upper surface 34, provides a height difference $\Delta h3$ between cover 40 and weighing unit 30.

For some applications, height H1 of cover 40 is between 2-8 cm, and height H2 of weighing unit 30 is between 2.1-10 cm. Typically, height difference $\Delta h3$ is a minimum of 0.1 cm, and/or a maximum of 5 cm, e.g., between 0.1 cm and 5 cm. For example, height difference $\Delta h3$ is a minimum of 0.5 cm and/or a maximum of 2 cm, e.g., between 0.5 cm and 2 cm. Or, height difference $\Delta h3$ may be a minimum of 0.5 cm and/or a maximum of 1 cm, e.g., between 0.5 cm and 1 cm.

As described hereinbelow with reference to FIG. 4D, when a load is lifted by the forklift a gap is formed between cover 40 and the load due to height difference $\Delta h3$ between cover 40 and weighing unit 30. Typically, the load lifted by the forklift is fully supported and thereby weighed by weighing unit 30 and not by cover 40.

Reference is made to FIGS. 4A-D, which are schematic illustrations of weighing apparatus 20 being used with a forklift having tines 100, in accordance with some applications of the present invention.

FIG. 4A shows forklift 300 comprising a pair of tines 100, and a respective unit of weighing apparatus 20 fitted onto each one of tines 100 by sliding tine 100 into cover 40. When cover 40 is placed to surround tine 100, weighing unit 30 is automatically positioned along a length of tine 100. It is noted that for some applications, a single unit of weighing apparatus 20 is shaped and sized to fit onto a pair of tines 100.

Optionally, but not necessarily, weighing apparatus 20 is secured to tine 100 by using a securing element. For example, a securing element 80 is used to removably secure weighing apparatus 20 to forklift 300 by securing cover 40 to the forklift, as shown in FIG. 4B. In accordance with respective applications, securing element 80 may be integrated with forklift 300 or is a separate element that is fitted onto the forklift. It is noted that securing element 80 is shown as a chain by way of illustration and not limitation. It is noted that any other type of securing element may be used to secure weighing apparatus 20 to forklift 300 and prevent sliding of cover 40 from tine 100. It is further noted that for other applications weighing apparatus 20 is secured to tine 100 simply by sliding tine 100 into cover 40.

FIG. 4B additionally shows a cross section of weighing apparatus 20 with tine 100 inserted into cover 40 such that upper-surface 44 of cover 40 resides above an upper-surface of tine 100. Placement of tine 100 within cover 40, typically stabilizes and positions weighing unit 30 with respect to tine 100, such that loads lifted by tine are supported and weighed by weighing unit 30.

Figure 4C:
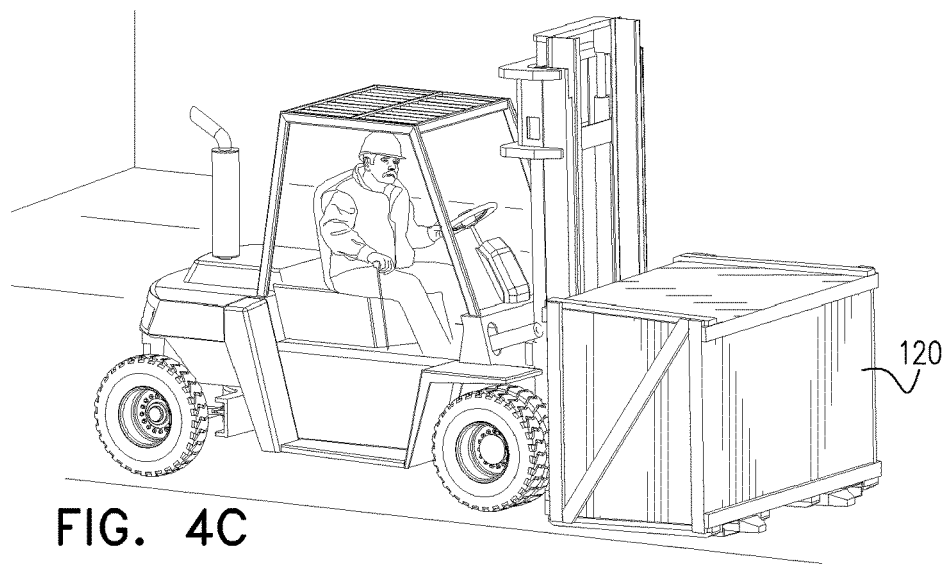

FIG. 4C is a schematic illustration weighing apparatus 20 being used with forklift 300, while forklift 300 is lifting load 120. As described hereinabove, weighing apparatus 20 is configured to measure a weight of load 120 while it is lifted by forklift 300. Weighing apparatus 20 is typically configured for use with standard and non-standard loads.

Generally, the vertical space that is available above tines 100 is limited, for example due to pallets that are used with the forklift having standardized receiving spaces into which the tines of the forklift are inserted. Therefore, disadvantageously, any devices mounted onto the tine in addition to the load lifted by the forklift, add height to the already limited vertical space above the tine. Advantageously, weighing apparatus 20 is particularly configured for minimizing the height that is added to tines 100 when weighing apparatus 20 is used with forklift 300. Typically, weighing apparatus 20 adds less height above the tine in comparison to if the load cells were to be disposed above or below the cover that is placed on the tine. For example, if the load cells were to be disposed above the cover that is placed on the tine, the in addition to the load cells themselves, the weighing apparatus would require a further cover to cover the load cells, which would further add to the height of the tines.

In contrast, weighing apparatus 20 minimizes the height added above tines 100. Typically, by providing weighing unit 30 alongside cover 40, as opposed to being mounted on or within cover 40, height of the weighing apparatus is reduced. Additionally, load 120 is directly placed on upper surface 34 of weighing unit 30 such that no additional spacing between any one of load 120, weighing unit 30 and tine 100, is required. Typically, a height of upper surface 34 of weighing unit 30 above tine 100 is 0.1-5 cm, indicating the total height added above tine 100 by weighing apparatus 20. Additionally, or alternatively, a width that weighing apparatus 20 adds to tine 100 is less than 8 cm.

Figure 4D:
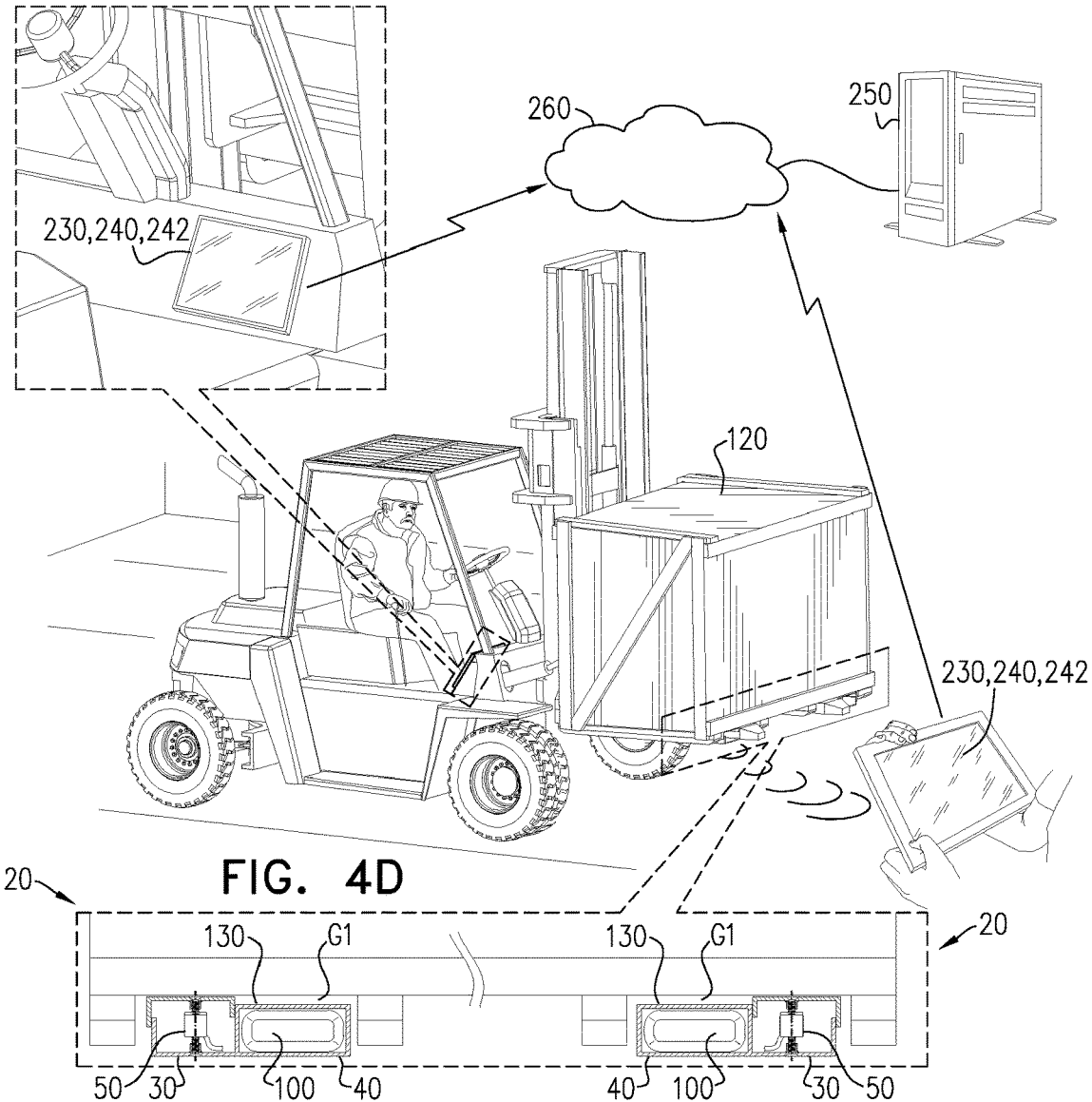

As shown in FIG. 4D, due to height difference Δh3 between cover 40 and weighing unit 30, when lifting load 120 by forklift 300, load 120 contacts upper surface 34 of weighing unit 30 but does not contact cover 40. Also, as shown, a gap G1 forms between upper surface 44 of cover 40 and load 120, such that load 120 is fully supported and weighed by weighing unit 30.

FIG. 4D additionally shows display 240 such as a screen or monitor for displaying the weight measurements obtained from weighing unit 30 (the connection between weighing apparatus 20 and display 240 may be wired or wireless), as well as computer processor 242. For some applications, a user interface 230 having a display such as a screen and/or at least one input means may be used with weighing apparatus 20. Typically, computer processor 242 receives and/or processes the measurements that are made by the load cells. It is noted that display 240, computer processor 242, and/or user interface 230 may be located within the forklift 300, and/or in a device (e.g., a handheld device that is typically used in the vicinity of the forklift), with both of these options being shown in FIG. 4C. In accordance with some applications of the present invention, the obtained measurements may be saved in computer processor 242, a remote server 260, and/or a remote computer processor 250.

Reference is made to FIGS. 1-4D. In accordance with some applications of the present invention, weighing apparatus 20 is configured for use with any type of a lifting device having a lifting platform, e.g., a lifting vehicle either motorized or manual. In accordance with some applications of the present invention, weighing apparatus 20 additionally comprises assistive devices for contributing to safe operation of forklift 300. For example, weighing apparatus 20 may comprise imaging devices, laser markers etc. In accordance with some applications of the present invention, cover 40 is shaped and sized to surround tine 100 along an entire length of tine 100 or alternatively along only a portion of the length of tine 100. Similarly, weighing unit 30 may be shaped and sized to be disposed along an entire length of tine 100 or alternatively along only a portion of the length of tine 100. For some applications, cover 40 and/or weighing unit 30 may be provided as a single unit, or alternatively cover 40 and/or weighing unit 30 may be provided as segmented units disposed on and alongside the tine (the segment may or may not be connected to each other).

Figure 5B:
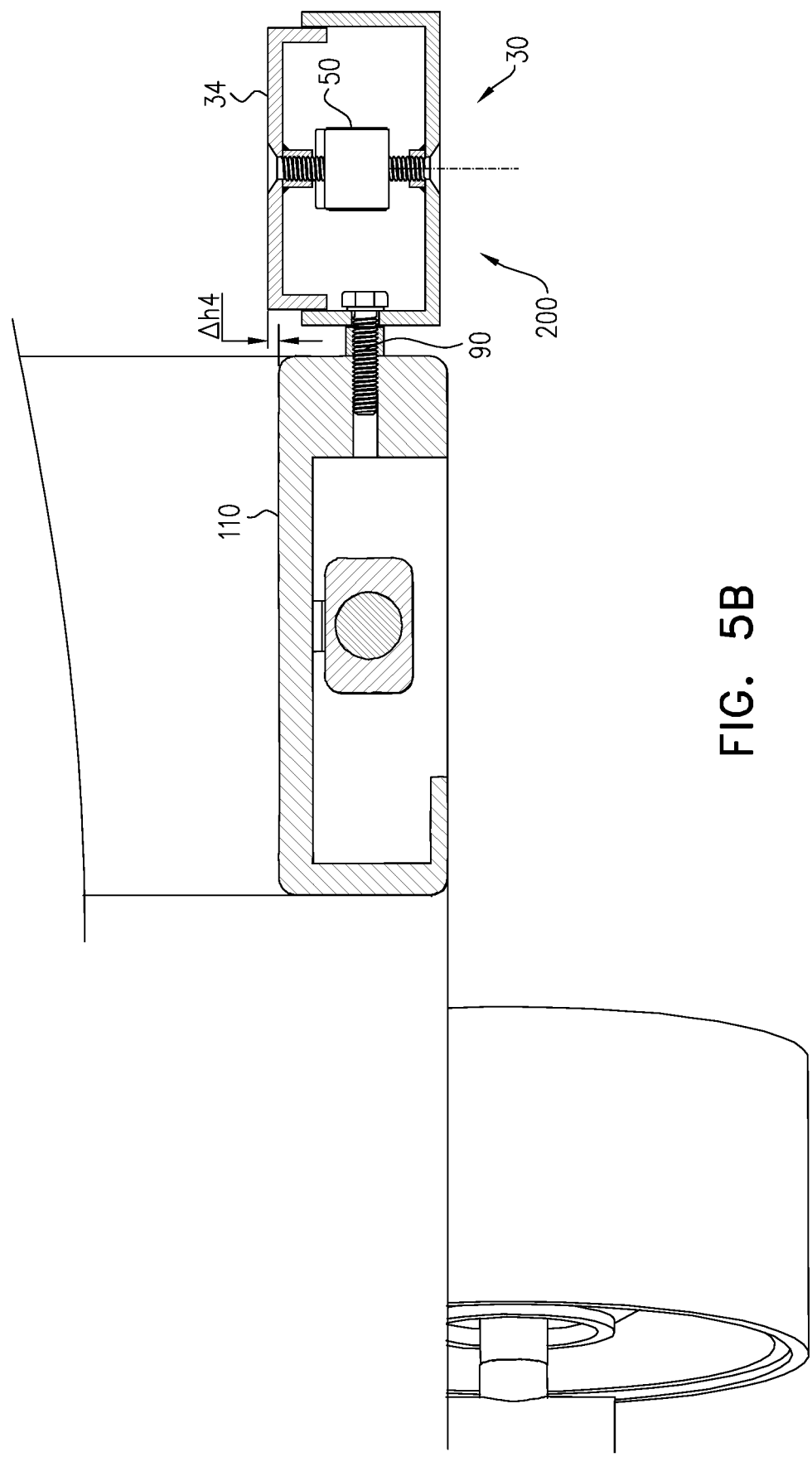
FIG. 5B is a schematic illustration of a cross section of the weighing apparatus of FIG. 5A, in accordance with some applications of the present invention.

Reference is now made to FIGS. 5A and 5B, which are schematic illustrations of weighing apparatus 200 for use with a lifting device, such as a forklift and/or a pallet truck, in accordance with some applications of the present invention. Typically, weighing apparatus 200 comprises weighing unit 30 (weighing unit 30 is as described hereinabove with reference to FIGS. 1-4), and a coupling element 90, which couples weighing unit 30 to a portion of the lifting device, e.g., to a tine of the lifting device. Typically, weighing apparatus 200 does not comprise a cover (as provided by cover 40 of weighing apparatus 20 described hereinabove with reference to FIGS. 1-4). Therefore, weighing apparatus 200 may be particularly suited for operation with a pallet truck (or any other lifting device having tines on wheels), as coupling element 90 is not fitted over or around the tine.

As shown in FIG. 5A, coupling element 90 is typically configured to couple weighing unit 30 to a lateral side of a tine of the lifting device such that: (a) weighing unit 30 is placed alongside the tine, and (b) a height of the upper surface 34 of weighing unit 30 is greater than a height of an upper surface 110 of the tine. Due to the difference in height between the weighing unit and the tine, a gap is formed between the load and the tine when a load is lifted by the lifting device (such that the load is fully supported and weighed by weighing unit 30).

For some applications, coupling element 90 comprises a mechanical coupling element such as a screw. Additionally, or alternatively, coupling element 90 may comprise any other suitable type of coupling element, e.g., a magnetic coupling element, and or an adhesive. For some application, subsequently to weighing a load using apparatus 200, coupling element 90 may be removed to allow separation of weighing unit 30 from the tine.

FIG. 5B, is a schematic illustration of a cross section of weighing apparatus 200 shown in FIG. 5A, in accordance with some applications if the present invention. (The direction of the cross section that is shown in FIG. 5B is indicated in FIG. 5A.) As shown, weighing unit 30 is coupled to a lateral side of the tine, such that weighing unit 30 is placed alongside the tine. Additionally, as shown, a height difference Δh4 exists between the tine and weighing unit 30. Height difference Δh4 is generally similar to height difference Δh3 described hereinabove with reference to weighing apparatus 20.

Figure 6B:
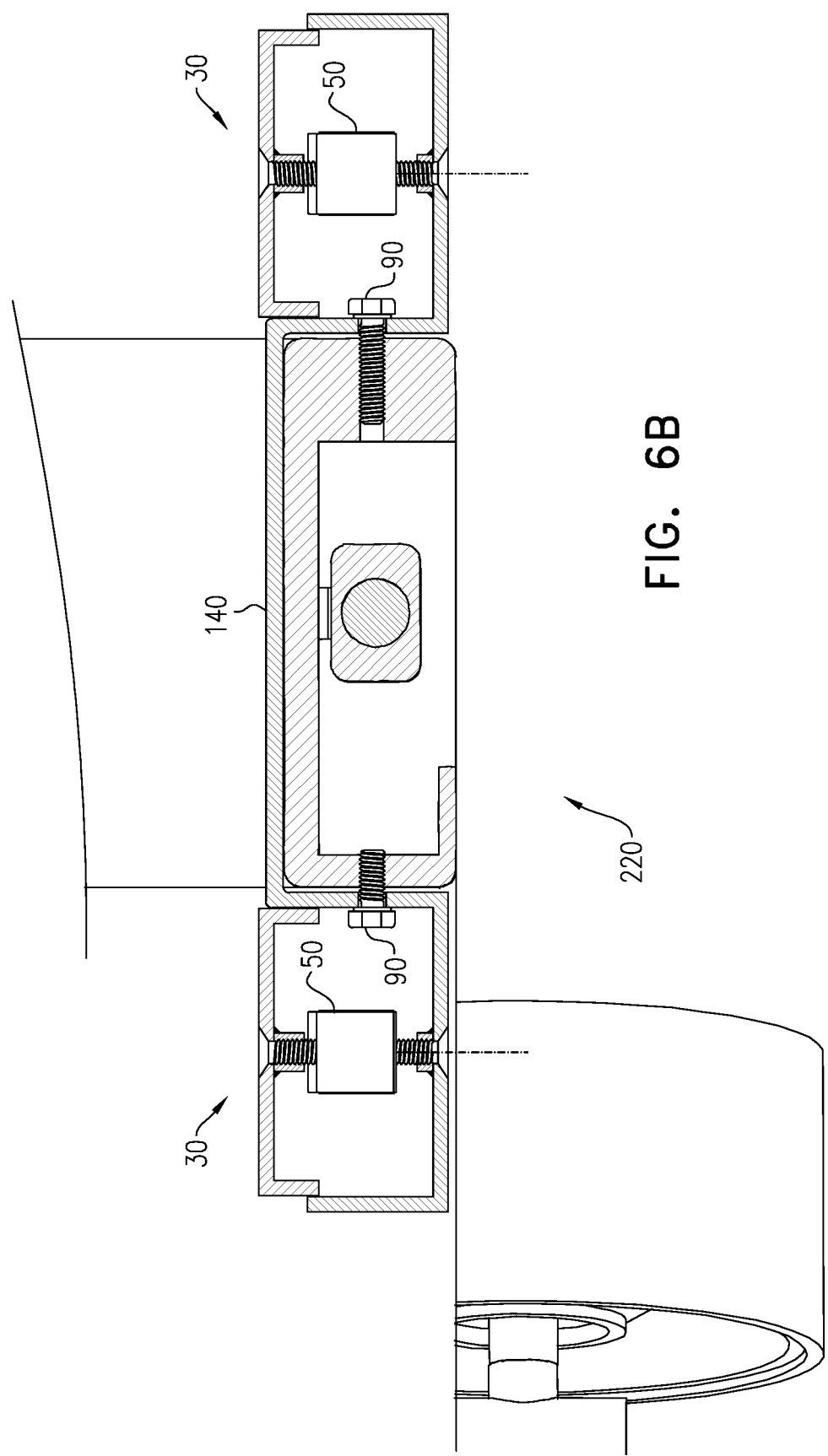
FIG. 6B is a schematic illustration of a cross section of the weighing apparatus of FIG. 6A, in accordance with some applications of the present invention.

Reference is now made to FIGS. 6A and 6B, which are schematic illustrations of weighing apparatus 220 for use with a lifting device, such as a forklift and/or a pallet truck, in accordance with some applications of the present invention. For some applications, weighing apparatus 220 comprises a cover 140 configured to partially surround a tine of a lifting device, e.g., by being disposed around an upper portion of the tine. Weighing apparatus 220 may be particularly suited for operation with a pallet truck (or any other lifting device having tines on wheels), as cover 140 is generally disposed around the upper portion of the tine, such that operation of wheels is not disrupted. Optionally but not necessarily, apparatus 220 additionally comprises one or more coupling elements 90, as described hereinabove with reference to FIGS. 5A-B, which are configured to couple one or more weighing unit 30 to one or more lateral sides of the tine, by coupling cover 140 to the tine. It is noted that any other type of coupling element may be used to secure weighing apparatus 220 to the tine. It is further noted that for other applications cover 140 is coupled to the tine simply by fitting cover 140 onto the tine.

FIG. 6B, is a schematic illustration of a cross section of weighing apparatus 220 shown in FIG. 6A, in accordance with some applications if the present invention. (The direction of the cross section that is shown in FIG. 6B is indicated in FIG. 6A.) As shown, at least one weighing unit 30 is coupled to at least one lateral side of the tine, such that weighing unit 30 is placed alongside the tine. As shown, a height difference exists between the cover 140 and weighing unit 30, such that a gap is formed between a lifted load and cover 140 when a load is lifted by the lifting device (such that the load is fully supported and weighed by weighing unit 30).

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Weighing apparatus for use with a lifting device that includes a tine, the weighing apparatus comprising:
 a cover shaped and sized to at least partially surround the tine of the lifting device;
 a weighing unit configured to weigh a load that is lifted by the lifting device, the weighing unit coupled to a lateral side of the cover such that the weighing unit is placed alongside the cover, and comprising:
  (i) one or more load cells; and
  (ii) an upper surface disposed above the one or more load cells and configured to contact the load lifted by the lifting device; and
 wherein a height of the weighing apparatus varies between the cover and the weighing unit such that a height of the weighing unit is greater than a height of the cover, thereby forming a gap between the load and the cover when a load is lifted by the lifting device.

2. The weighing apparatus according to claim 1, wherein the cover comprises a sleeve shaped and sized to at least partially surround the tine.

3. The weighing apparatus according to claim 1, wherein the cover comprises a sleeve shaped and sized to receive the tine of the lifting device to fully surround at least a portion of the tine.

4. The weighing apparatus according to claim 1, wherein the cover is configured to partially surround the tine of the lifting device such that an upper portion of the tine is covered by the cover, and a lower portion of the tine is not covered by the cover.

5. The weighing apparatus according to claim 4, wherein the lower portion of the tine comprises one or more wheels, and wherein the cover allows operation of the one or more wheels.

6. The weighing apparatus according to claim 1, wherein the cover is removably couplable to the tine of the lifting device.

7. The weighing apparatus according to claim 1, wherein a height of the upper surface of the weighing unit above the tine is 0.1-5 cm.

8. The weighing apparatus according to claim 1, wherein a height difference between the cover and the weighing unit is 0.1-5 cm.

9. The weighing apparatus according to claim 1, wherein a height difference between the cover and the weighing unit is 0.5-1 cm.

10. The weighing apparatus according to claim 1, wherein a height difference between the cover and the weighing unit is 0.5-2 cm.

11. The weighing apparatus according to claim 1, wherein a width that the apparatus adds to the tine is less than 8 cm.

12. The weighing apparatus according to claim 1, wherein the weighing unit further comprises a lower surface, and wherein the one or more load cells are disposed between the lower surface and the upper surface of the weighing unit such as to contact the lower and upper surfaces of the weighing unit.

13. The weighing apparatus according to claim 1, wherein the lifting device comprises a forklift, and the weighing apparatus is configured for use with the forklift.

14. A method of weighing a load lifted by a lifting device that includes a tine, the method comprising:
 at least partially surrounding the tine of the lifting device with a cover, the cover being coupled to a weighing unit alongside a lateral side of the cover, the weighing unit including one or more load cells;
 lifting the load by the lifting device such that (i) the load contacts the weighing unit, and (ii) a gap forms between the cover and the load; and
 weighing the load using the load cells in the weighing unit.

15. The method according to claim 14, wherein at least partially surrounding the tine of the lifting device with the cover comprises fully surrounding the tine with a sleeve.

16. The method according to claim 14,
 wherein at least partially surrounding the tine of the lifting device with the cover comprises partially surrounding the tine of the lifting device such that an upper portion of the tine is covered by the cover, and a lower portion of the tine is not covered by the cover, and
 wherein the lower portion of the tine has one or more wheels, and wherein at least partially surrounding the tine of the lifting device with the cover comprises surrounding the tine with the cover such that the one or more wheels are allowed to operate.

17. The method according to claim 14, further comprising removably securing the cover to the lifting device using a securing element.

18. Weighing apparatus for use with a lifting device that includes a tine, the weighing apparatus comprising:
 a weighing unit configured to weigh a load that is lifted by the lifting device, the weighing unit comprising:
  (i) one or more load cells; and (ii) an upper surface disposed above the one or more load cells and configured to contact the load lifted by the lifting device; and a coupling element configured to couple the weighing unit to a lateral side of the tine of the lifting device such that:
(a) the weighing unit is placed alongside the tine, and
(b) a height of the upper surface of weighing unit is greater than a height of an upper surface of the tine, thereby forming a gap between the load and the tine when a load is lifted by the lifting device.

19. The weighing apparatus according to claim 18, wherein the coupling element comprises a mechanical coupling element.

20. The weighing apparatus according to claim 18, wherein the coupling element comprises a magnetic coupling element.

21. The weighing apparatus according to claim 18, wherein the coupling element comprises a cover shaped and sized to at least partially surround a tine of the lifting device.

22. The weighing apparatus according to claim 18, wherein the lifting device comprises a forklift and the weighing apparatus is configured for use with the forklift.

23. The weighing apparatus according to claim 18, wherein the lifting device comprises a pallet truck and the weighing apparatus is configured for use with the pallet truck.

24. The weighing apparatus according to claim 18, wherein the coupling element is configured to couple the weighing unit to the lateral side of the tine of the lifting device such that a height of the upper surface of the weighing unit above the upper surface of the tine is 0.1-5 cm.

25. The weighing apparatus according to claim 18, wherein the weighing unit further comprises a lower surface, and wherein the one or more load cells are disposed between the lower surface and the upper surface of the weighing unit such as to contact the lower and upper surfaces of the weighing unit.

* * * * *